(12) United States Patent
Sudkovich et al.

(10) Patent No.: US 9,529,782 B2
(45) Date of Patent: Dec. 27, 2016

(54) UNIFIED MODELING OF HTML OBJECTS FOR USER INTERFACE TEST AUTOMATION

(71) Applicants: Alex Sudkovich, Ashdod (IL); Asaf Saar, Leimen (DE)

(72) Inventors: Alex Sudkovich, Ashdod (IL); Asaf Saar, Leimen (DE)

(73) Assignee: SAP PORTALS ISRAEL LTD., Ra'Anana (IL)

( * ) Notice: Subject to any disclaimer, the term of this patent is extended or adjusted under 35 U.S.C. 154(b) by 597 days.

(21) Appl. No.: 14/026,445

(22) Filed: Sep. 13, 2013

(65) Prior Publication Data

US 2015/0082144 A1 Mar. 19, 2015

(51) Int. Cl.
| | | |
|---|---|---|
| *G06F 17/21* | (2006.01) | |
| *G06F 17/22* | (2006.01) | |
| *G06F 9/44* | (2006.01) | |
| *G06F 11/36* | (2006.01) | |
| *G06F 17/24* | (2006.01) | |

(52) U.S. Cl.
CPC ............. *G06F 17/2247* (2013.01); *G06F 8/36* (2013.01); *G06F 11/3684* (2013.01)

(58) Field of Classification Search
CPC ................................................. G06F 17/2247

USPC .......................................................... 715/234
See application file for complete search history.

(56) References Cited

U.S. PATENT DOCUMENTS

| | | | | |
|---|---|---|---|---|
| 2006/0026506 A1* | 2/2006 | Kristiansen | ......... | G06F 11/3688 715/243 |
| 2011/0161395 A1* | 6/2011 | O'Donnell, III | .... | G06F 11/3414 709/203 |
| 2012/0204091 A1* | 8/2012 | Sullivan | .............. | G06F 11/3664 715/234 |
| 2013/0159784 A1* | 6/2013 | Rossi | ..................... | G06F 11/263 714/47.1 |
| 2013/0332905 A1* | 12/2013 | Vikutan | .............. | G06F 11/3684 717/124 |
| 2013/0339930 A1* | 12/2013 | Xu | ...................... | G06F 11/3684 717/125 |

* cited by examiner

*Primary Examiner* — James J Debrow
(74) *Attorney, Agent, or Firm* — Buckley, Maschoff & Talwalkar, LLC

(57) ABSTRACT

According to some embodiments, a method and apparatus are provided to receive information to register an HTML object at an HTML object framework and receive identification parameters associated with the HTML object. A plurality of existing HTML objects is searched via a processor based on the received identification parameters. A HTML object is retrieved via the processor from the plurality of existing HTML objects and the retrieved HTML object is displayed.

20 Claims, 5 Drawing Sheets

300

```
<div id="UserRole" class="sapUiTfBack sapUiTfBrd
sapUiTfCombo sapUiTfStd" style="width: 100%;" aria-
owns="UserRole-input UserRole-lb" role="combobox" data-sap-
ui="UserRole" aria-expanded="false">

<div id ="UserRole-icon" class="sapUiTFComboIcon"
role="resentation" unselectable="on">-</div>

<input id="UserRole-input" class="sapUiTf sapUiTfIner"
value="Administrator" sytle="width:100%;text-aligh:left" aria-
posinset="1" aria-setsite="2" aria-live="polite" areia-
autocomplete="list" dir="Inherit" tabindex="0"></input>

</div>
```

FIG. 3

UNIFIED MODELING OF HTML OBJECTS FOR USER INTERFACE TEST AUTOMATION

BACKGROUND

Many software applications function as web-based applications which are accessed via a web browser such as, for example, Internet Explorer, Chrome, Firefox, and Safari. To test a web-based application using multiple web browsers, test automation is frequently used. Test automation, in this case, refers to using a software tool to run repeatable tests against a web-based application. A number of open source tools are available for test automation. Selenium, for example, is an open source test automation tool.

A developer of test automation programming creates test code to manipulate an HTML object. This test code has to be developed, maintained and adapted each time an automated action will be performed on the HTML object for each different type of web browser. Changing the properties of the HTML object also creates additional maintenance of the test code as well as increasing the time and expensive of web testing for the various web browsers.

BRIEF DESCRIPTION OF THE DRAWINGS

FIG. 3 illustrates code associated with an HTML object according to some embodiments.

DETAILED DESCRIPTION

The present embodiments relate to a method to model and search existing HTML objects to facilitate reuse of the existing HTML objects for program code. HTML objects may be associated with a plurality of properties such as a name, a unique identifier assigned by development framework (e.g., JAVA, SAPUI5, etc.), a width, a location on a screen, etc. Furthermore, HTML objects may be associated with methods (e.g., displaying a list of all elements, check or uncheck a box, etc.). HTML objects may include different types of objects (e.g., combobox, list box, check box, etc.) and each type of HTML object may have its own underlying structure that is unique to that type of HTML object. In some embodiments, the underlying structure may comprise characteristics of the program coded associated with the HTML object that are unique to the particular type of HTML object, such as, but not limited to, classes used to create the object as well as the methods and the properties associated with the particular type of HTML object.

Knowing an underlying structure of an HTML object, each type of HTML object may be modeled based on its underlying structure. For example, an HTML object may be modeled on one or more identification parameters such as, but not limited to, an object identification ("ID") of the HTML object, one or more classes or class types of the HTML object or one or more application programming interfaces ("API") that is used to manipulate the particular HTML object.

Figure 1:
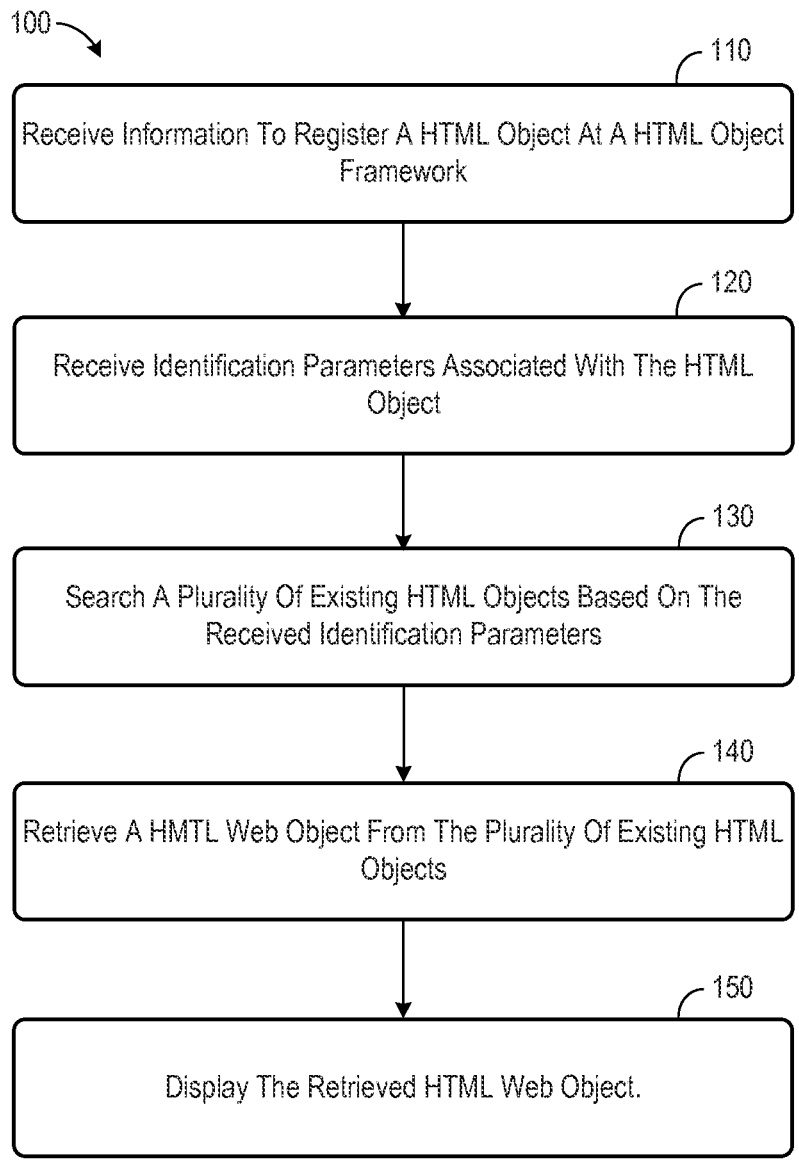
FIG. 1 illustrates a method according to some embodiments.
Figure 4:
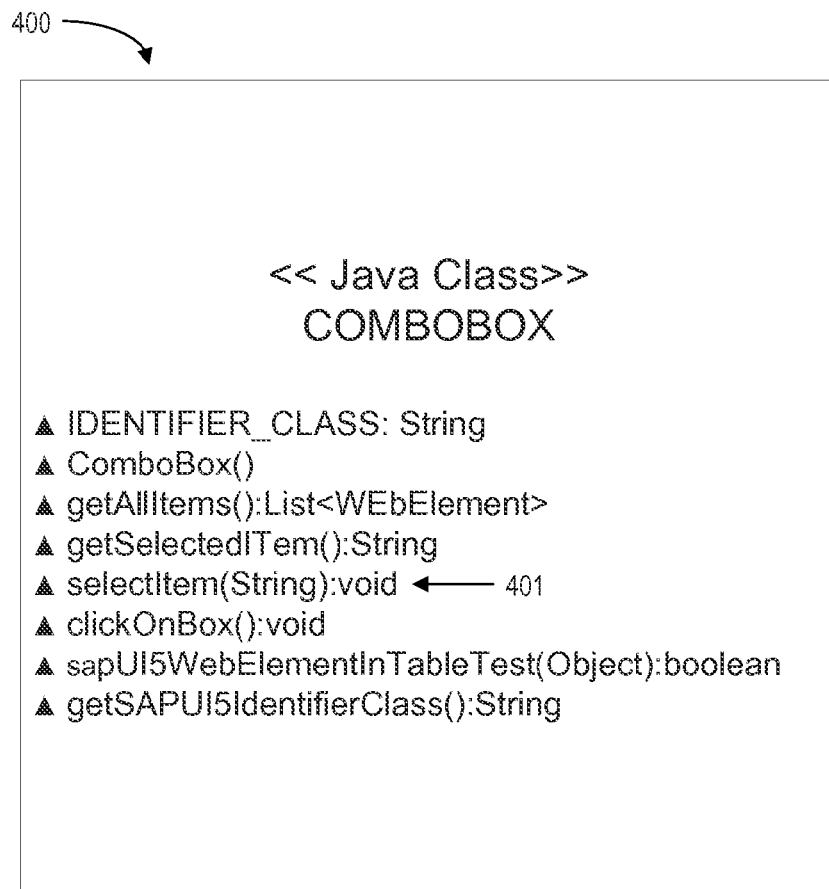
FIG. 4 illustrates object classes according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 4. At 110, an HTML object may be registered with an HTML object framework application. The HTML object framework application may utilize a registration process to learn, or receive, information about each type of HTML object so that the HTML object framework application knows about the underlying structure associated with the particular HTML object. Since HTML objects may be changed to suit a particular situation (e.g., name or behavior) it may be difficult for a developer to locate a particular type of HTML object. However, by using the HTML object framework, a developer can search for HTML objects based on the HTML object's underlying structure.

For illustrative purposes, and to aid in understanding features of the specification, an example will be introduced. This example is not intended to limit the scope of the claims. Now referring to FIG. 2, browser automation code 201 may comprise HTML code that comprises a plurality of HTML objects that are used for automatically testing a software application executed in a web browser or in a plurality of different web browsers. Furthermore, the browser automation code 201 may be associated with an open source automation tool framework 202 that is used for test automation such as, but not limited to, Selenium's open source automation tool. The browser automation code may run on top of the open source automation tool.

A user may wish to reuse a plurality of HTML objects from the browser automation code 201. Therefore, the user may enter information about the objects into an HTML object framework application. In some embodiments, the user may load the plurality of HTML objects into the HTML object framework to that the HTML object framework may learn about the underlying structure of the plurality of HTML objects.

Now referring to FIG. 3, an embodiment of an HTML object is illustrated. In the present embodiment, the HTML object may define a combobox. As can be seen from the code associated with the HTML object, the combobox may be associated with (1) a combobox class such as sapUiTf-Combo as well as (2) an element ID of UserRole. In some embodiments, the combobox of FIG. 3 may be associated with a plurality of classes. Furthermore, the underlying structure may comprise application programming interfaces ("APIs") that manipulate the HTML object. In some embodiments, specific object oriented classes that call an HTML object may be associated with the HTML object's underlying structure.

Referring back to FIG. 1, at 120, identification parameters that are associated with an HTML object for browser automation code are received. The identification parameters may be received at an HTML object framework application.

Continuing with the above example, and again referring to FIG. 2, browser automation code 201 may comprise a plurality of HTML objects and the user may wish to reuse some of the HTML objects from browser automation code 201 to create a new test program such as browser automation code 203. The user may search for specific HTML objects within browser automation code 201 (e.g., a source) by entering identification parameters that are associated with a specific HTML object.

In some embodiments, the user may enter an indication associated with a combobox (or other general types of an HTML object) into the HTML object framework. A user might be motivated to enter an indication of a general type of an HTML object in order to retrieve multiple HTML objects associated with the general type. In other embodiments, the user may enter in specific identification parameters associated with a particular HTML object (e.g., a specific combobox that employs a specific class).

For example, and again referring to FIG. 3, the user may wish to add a specific combobox to the browser automation code 203. The specific combobox may be searched for using identification parameters associated with the specific combobox. As illustrated at 300, the specific combobox may be represented in HTML as a few HTML elements that are separated by a <div> </div> tags. The specific combobox may also associated with a combobox class such as sapUiTfCombo which is specific to SAPUi5 as well as other classes that define an underlying structure such as sapUiTfBack, sapUiTfBrd and sapUiTfStd. Furthermore, the specific combobox may have an element ID of UserRole. In the present example, the user may submit a search with an element ID of UserRole that is associated with a sapUiTfCombo class. Alternatively, the user may search sapUiTfCombo to determine all comboboxes associated with this class.

In a second example, the HTML elements illustrated at 300 may be also associated with a Java class (e.g., a class associated with an object-oriented programming language). For example, the combobox of 300 may be associated with one or more Java classes as illustrated at 400 of FIG. 4 such as a Java class called selectItems 401 which may also be used to identify an HTML object.

In some embodiments, the HTML object may be associated with one or more APIs that may be used to manipulate the HTML object. For example, and in the case of a combobox HTML object, the APIs may be used to identify a combobox, find a combobox arrow, open the combobox (e.g., click on the arrow), find menu items, find requested items, and/or select an item in the combobox. An API may also be used to identify a specific combobox object if the type of manipulation is specific to a particular combobox object. The search criteria may be received at an apparatus such as apparatus 500 of FIG. 5.

Referring back to FIG. 1, at 130 a plurality of existing HTML objects are searched based on the received identification parameters. The searching may be performed via a processor such as the processor described with respect to FIG. 5. The search may return one or more HTML objects that comprise the identification parameters.

Figure 2:
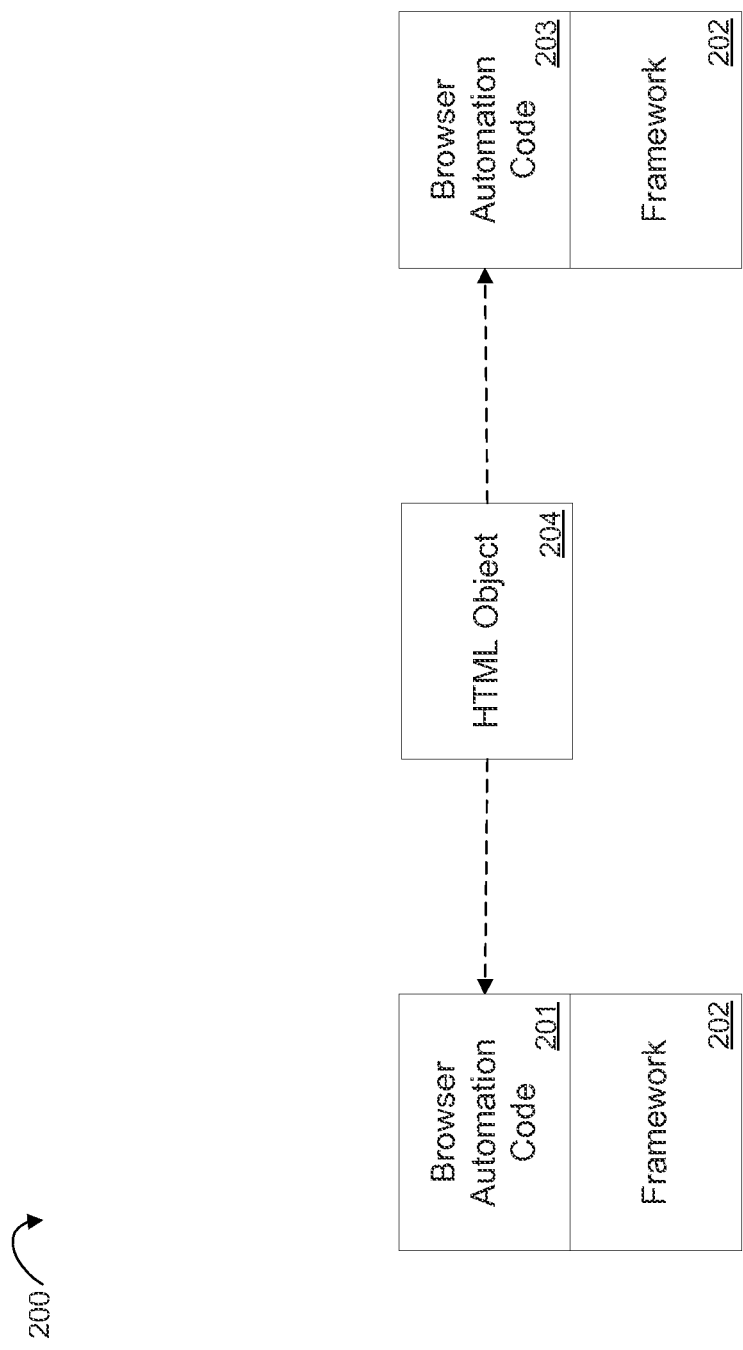
FIG. 2 illustrates a reusable HTML object shared between programs according to some embodiments.

Continuing with the above example, and referring to FIG. 2, the received identification parameters may be used as search criteria to search underlying structures of HTML objects of browser automation code 201 to determine a specific HTML object 204 such as the combobox of FIG. 3.

At 140, a HTML object is retrieved via the processor from the plurality of existing HTML objects. Continuing with the above example, and referring to FIG. 2, the identification parameters are used to search a plurality of HTML objects located in browser automation code 201 and the search results with HTML object 204. Retrieving an HTML object may comprise displaying code (e.g., HTML code, JAVA code, etc.) that is associated with the retrieved HTML object.

At 150, the retrieved HTML object is displayed. For example, the HTML code of a combobox, such as the code displayed in FIG. 3, may be displayed. The user may use/copy the displayed HTML object for use in the new browser automation code 203.

Figure 5:
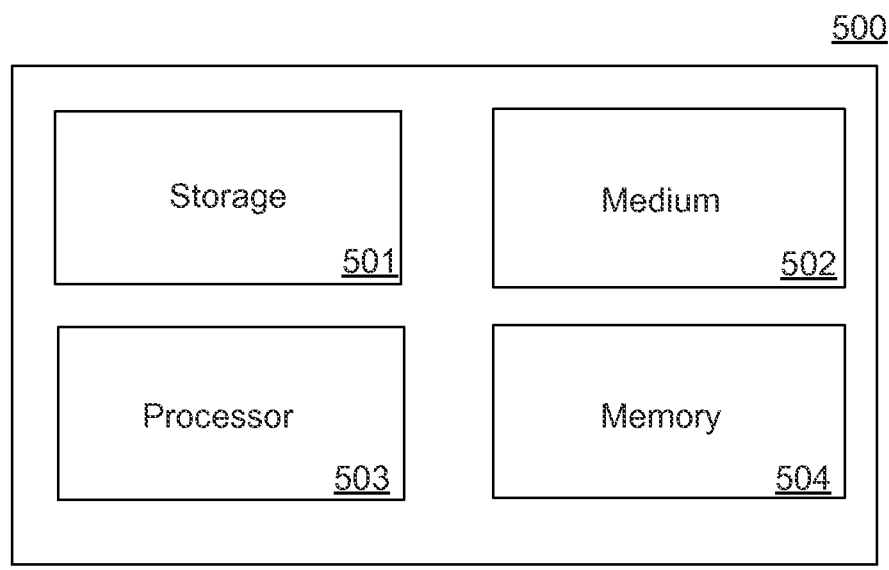
FIG. 5 illustrates an apparatus according to some embodiments.

Now referring to FIG. 5, an embodiment of an apparatus 500 is illustrated. In some embodiments, the apparatus 500 may be associated with a determining HTML objects based on an underlying structure of the HTML object.

The apparatus 500 may comprise a storage device 501, a medium 502, a processor 503, and memory 504. According to some embodiments, the apparatus 500 may further comprise a digital display port, such as a port adapted to be coupled to a digital computer monitor, television, portable display screen, or the like.

The medium 502 may comprise any computer-readable medium that may store processor-executable instructions to be executed by the processor 503. For example, the medium 502 may comprise a non-transitory tangible medium such as, but not limited to, a compact disk, a digital video disk, flash memory, optical storage, random access memory, read only memory, or magnetic media.

A program may be stored on the medium 502 in a compressed, uncompiled and/or encrypted format. The program may furthermore include other program elements, such as an operating system, a database management system, and/or device drivers used by the processor 503 to interface with peripheral devices.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 1.

The processor 503 communicates with the storage device 501. The storage device 501 may comprise any appropriate information storage device, including combinations of magnetic storage devices (e.g., a hard disk drive), optical storage devices, flash drives, and/or semiconductor memory devices. The storage device 501 stores a program for controlling the processor 503. The processor 503 performs instructions of the program, and thereby operates in accordance with any of the embodiments described herein.

The main memory 504 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 504 may comprise a plurality of memory modules.

As used herein, information may be "received" by or "transmitted" to, for example: (i) the apparatus 500 from another device; or (ii) a software application or module within the apparatus 500 from another software application, module, or any other source.

In some embodiments, the storage device 501 stores a database (e.g., including information associated with underlying structures of HTML objects). Note that the database described herein is only an example, and additional and/or different information may be stored therein. Moreover, various databases might be split or combined in accordance with any of the embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method to reuse HTML objects comprising:
registering an HTML object associated with a first program at an HTML object framework, the registering based on characteristics of program code unique to the HTML object;
receiving, at the HTML object framework, identification parameters associated with the HTML object, the identification parameters comprising, at least, (i) a class type specific to the HTML object or (ii) an application programming interface ("API") that manipulates the HTML object where the API's manipulation is specific to the HTML object;
searching, via a processor, a plurality of HTML objects associated with the first program based on the received identification parameters;
retrieving an HTML object associated with the received identification parameters, via the processor, from the plurality of HTML objects associated with the first program; and
displaying the retrieved HTML object associated with the received identification parameters for reuse in a second program.

2. The method of claim 1, wherein the HTML object framework registers the HTML object based on an underlying structure of the HTML object that comprises the characteristics of program code unique to the HTML object.

3. The method of claim 1, wherein the identification parameters associated with the HTML object further comprise an ID of the HTML object.

4. The method of claim 1, wherein the identification parameters associated with the HTML object further comprise one or more methods associated with the HTML object.

5. The method of claim 1, wherein the HTML object framework is associated with an automation tool and the first program and the second program run on top of the HTML object framework.

6. The method of claim 1, wherein the HTML object comprises at least one of a combo box, pop-up window, navigation bar, and button.

7. The method of claim 1 wherein the HTML object is represented by a Java class.

8. The method of claim 1 wherein the characteristics of program code unique to the HTML object comprise the class type specific to the HTML object and the API that manipulates the HTML object.

9. A non-transitory computer-readable medium comprising instructions that when executed by a processor perform a method, the method comprising:
registering an HTML object associated with a first program at an HTML object framework, the registering based on characteristics of program code unique to the HTML object;
receiving, at an HTML object framework, identification parameters associated with the HTML object the identification parameters comprising, at least, (i) a class type specific to the HTML object or (ii) an application programming interface ("API") that manipulates the HTML object where the API's manipulation is specific to the HTML object;
searching, via a processor, a plurality of HTML objects associated with the first program based on the received identification parameters;
retrieving an HTML object associated with the received identification parameters, via the processor, from the plurality of HTML objects associated with the first program; and
displaying the retrieved HTML object associated with the received identification parameters for reuse in a second program.

10. The medium of claim 9, wherein the identification parameters associated with the HTML object further comprise an ID of the HTML object.

11. The medium of claim 9, wherein the identification parameters associated with the HTML object comprise at least a class type of the HTML object.

12. The medium of claim 9, wherein the HTML object framework is associated with an automation tool and the first program and the second program run on top of the HTML object framework.

13. The medium of claim 9, wherein the HTML object comprises at least one of a combo box, pop-up window, navigation bar, and button.

14. The medium of claim 9, wherein the HTML object framework registers the HTML object based on an underlying structure of the HTML object that comprises the characteristics of program code unique to the HTML object.

15. An apparatus comprising:
a processor; and
a non-transitory computer-readable medium comprising instructions that when executed by a processor perform a method, the method comprising:
registering an HTML object associated with a first program at an HTML object framework, the registering based on characteristics of program code unique to the HTML object;
receiving, at an HTML object framework, identification parameters associated with the HTML object, the identification parameters comprising, at least, (i) a class type specific to the HTML object and (ii) an application programming interface ("APP") that manipulates the HTML object where the API's manipulation is specific to the HTML object;
searching, via the processor, a plurality of HTML objects associated with the first program based on the received identification parameters;
retrieving an HTML object associated with the received identification parameters, via the processor, from the plurality of HTML objects associated with the first program; and
displaying the retrieved HTML object associated with the received identification parameters for reuse in a second program.

16. The apparatus of claim 15, wherein the identification parameters associated with the HTML object further comprise an ID of the HTML object.

17. The apparatus of claim 15, wherein the identification parameters associated with the HTML object comprise at least a class type of the HTML object.

18. The apparatus of claim 15, wherein the HTML object framework is associated with an automation tool and the first program and the second program run on top of the HTML object framework.

19. The apparatus of claim 15, wherein the HTML object comprises at least one of a combo box, pop-up window, navigation bar, and button.

20. The apparatus of claim 15, wherein the HTML object framework registers the HTML object based on an underlying structure of the HTML object that comprises the characteristics of program code unique to the HTML object.

* * * * *